3,400,075
LUBRICATING COMPOSITIONS INCLUDING A POLYMER WHICH CONTAINS A SALT OR AMIDE OF A DIIMIDE
Donald C. Grimm, Cuyahoga Falls, Ohio, and Leonard Pierce, Jr., St. Albans, W. Va., assignors to Union Carbide Corporation, a corporation of New York
No Drawing. Filed Nov. 15, 1966, Ser. No. 594,406
3 Claims. (Cl. 252—34)

The invention relates to lubricating compositions that contain a polymeric additive as a viscosity index improver and dispersant. In a particular aspect, the invention relates to hydrocarbon lubricating oils that contain as additives copolymers of an oil-solubilizing monomer and a salt or amide of a diimide.

Internal combustion engine lubricants are being called upon to perform at high levels of efficiency over increasingly long periods of time. Polymeric and other additives are employed in such lubricants to improve the viscosity index, to increase the detergency and the dispersant properties of the oil, to increase the load-bearing properties of the oil, and the like. This invention is concerned with a polymeric additive that serves the dual purpose of being a viscosity index improver and a dispersant.

The polymeric additives of the invention are copolymers (i.e., polymers of two or more monomers) of an oil-solubilizing monomer and a monomer imparting dispersant properties to the oil.

The oil-solubilizing monomer is normally a long chain (e.g., $C_8$–$C_{20}$) alkyl acrylate or methacrylate. Specific illustrative examples include octyl acrylate, nonyl methacrylate, isodecyl acrylate, decyl methacrylate, undecyl acrylate, lauryl acrylate, tridecyl methacrylate, myristyl acrylate, palmityl acrylate, stearyl acrylate, stearyl methacrylate, eicosyl acrylate, and the like. It may be desirable to employ a mixture of two or more oil-solubilizing monomers. For instance, it is desirable in some cases to employ an alkyl acrylate or methacrylate wherein the alkyl has at least 16 carbon atoms in combination with a shorter chain alkyl (e.g., $C_{10}$–$C_{12}$) acrylate or methacrylate. The longer chain alkyl groups help to increase the dispersant capacity of the polymer in order to help to prevent the polymer from losing oil-solubility by association with the partially oxidized products of combustion that constitute the major proportion of engine sludge. It is thus desirable that at least 15 weight percent, preferably at least 20 weight percent, and more preferably at least 30 weight percent of the oil-solubilizing monomer be an alkyl acrylate or methacrylate wherein the alkyl has 16 or more carbon atoms. A mixture of stearyl acrylate and isodecyl acrylate is a preferred oil-solubilizing monomer mixture.

It may also be desirable to include a small amount of a short chain alkyl acrylate or methacrylate in the polymer in order to enhance the viscosity index improving properties of the polymer. Specific illustrative examples include methyl methacrylate, methyl acrylate, ethyl methacrylate, isopropyl acrylate, butyl acrylate, and the like. Methyl methacrylate is preferred. The short chain (e.g., $C_1$–$C_4$) alkyl acrylate or methacrylate is usually used in small amounts, for example, from about 3 to about 15 weight percent of the total polymer weight.

The copolymer of the invention also contains an acrylic or methacrylic salt or amide of a diimide that can be represented by Formula I:

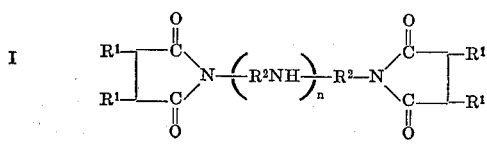

wherein each $R^1$ individually represents hydrogen, alkyl or alkenyl of up to 9 carbon atoms, or two $R^1$ groups can be joined together to form a cycloalkyl, cycloalkenyl, cycloalkadienyl, or an aryl group, wherein $R^2$ represents ethylene or propylene, and wherein $n$ represents a number having a value of at least 1, preferably at least 2 up to about 6. The diimides that are represented by Formula I can be prepared by reacting 2 moles of a dicarboxylic anhydride with 1 mole of a polyalkylenepolyamine such as diethylenetriamine, triethylenetetramine, tetraethylenepentamine, pentaethylenehexamine, hexaethyleneheptamine, heptethyleneoctamine, tripropylenetetramine, and the like. The reaction of anhydrides with amines to form imides is well known in the art, as is illustrated by U.S. Patent Nos. 3,194,813; 3,048,544 and 3,131,150. The anhydrides that are employed in the invention include succinic anhydride and, preferably, substituted succinic anhydrides such as: butenylsuccinic anhydride, pentenylsuccinic anhydride, hexenylsuccinic anhydride, octenylsuccinic anhydride, heptenylsuccinic anhydride, nonenylsuccinic anhydride, decenylsuccinic anhydride, undecenylsuccinic anhydride, dodecenylsuccinic anhydride, tetradecenylsuccinic anhydride, hexadecenylsuccinic anhydride, octadecenylsuccinic anhydride, butylsuccinic anhydride, heptylsuccinic anhydride, octylsuccinic anhydride, nonylsuccinic anhydride, decylsuccinic anhydride, laurylsuccinic anhydride, stearylsuccinic anhydride, eicosylsuccinic anhydride, tetrahydrophthalic anhydride, phthalic anhydride, methyltetrahydrophthalic anhydride, cyclohexanedicarboxylic anhydride, and the like. The preferred anhydrides are the alkenylsuccinic anhydrides wherein the alkenyl group has from 4 to 9 carbon atoms.

Alkenylsuccinic anhydrides can be produced by heating maleic anhydride and an olefin to a temperature of, for example, 200° C. This procedure is well known in the art. Alkylsuccinic anhydrides can be produced from alkenylsuccinic anhydrides by hydrogenation by known procedures.

The diimide is incorporated into the copolymers of the invention by the formation of a salt or amide with acrylic or methacrylic acid. The salt or amide can be formed either before or after the acrylic or methacrylic acid has been copolymerized with the oil-solubilizing monomers. The desired salt is formed simply by contacting the diimide with the carboxylic acid group. The amide is formed by contacting the reactants under dehydrating conditions. The salt form is preferred, although in actual use some amide will be formed by dehydration because the lubricating oil is normally heated to high temperatures during use.

The salt or amide of the diimide is employed in proportions such that the copolymer has detergent properties. For example, amounts of from about 3 to 15 weight percent of the salt or amide can be used (percentage based on weight of copolymer).

The copolymer of the invention can be produced by conventional polymerization techniques. For instance, the monomers can be mixed in the desired proportions along with a polymerization initiator. The polymerization reaction is then usually started by heating the reaction mixture to a temperature of at least the activation temperature of the initiator. The specific temperature employed will, of course, vary with the nature of the monomers and the initiator, but is usually within the range of from about 40° to about 110° C.

Polymerization initiators that can be employed include peroxides and azo compounds. Examples include t-butyl peroxypivalate, benzoyl peroxide, methyl ethyl ketone peroxide, t-butyl hydroperoxide, t-butyl perbenzoate, cumene hydroperoxide, azodiisobutyronitrile, dimethylazodiisobutyrate, isopropylperoxydicarbonate, and the like. Also useful are combinations of quaternary ammonium salts and peroxides. Examples of such salts include diisobutylphenoxyethoxyethyldimethylbenzyl ammonium chloride, lauryldimethylbenzyl ammonium chloride, and the like. The polymerization initiator is employed in conventional amounts such as from about 0.05 to about 0.5 weight percent, based on weight of monomers.

It is usually convenient to carry out the polymerization in a solvent such as pentane, hexane, heptane, octane, xylene, toluene, benzene, naphtha, or the like. When a volatile solvent is employed it can be distilled at the conclusion of the polymerization after oil has been added to the copolymer solution. This procedure produces a concentrated solution of the copolymer in oil and is a very convenient way to recover the copolymer.

The molecular weight of the copolymer that is useful in the invention is usually expressed in terms of reduced viscosity ($I_r$). Reduced viscosity is defined by the equation;

$$I_r = \frac{T - T_o}{T_o(c)}$$

wherein T is the time required for a low concentrate copolymer solution to pass through a standard Ubbelohde viscometer, $T_o$ is the time for the pure solvent to pass through the viscometer, and $c$ is the concentration of the copolymer in grams of copolymer per 100 milliliters of solvent. Unless otherwise specified, the reduced viscosities of the copolymers discussed herein were determined in a solution of 0.1 gram of copolymer in 100 milliliters of benzene at 20° C.

It has been found that the copolymers that are useful in the invention generally have reduced viscosities in the range of from about 0.3 to about 2, and preferably, from about 0.5 to 1.2.

The copolymers of the invention are employed as additives in oils in an amount sufficient to enhance the viscosity index and dispersant characteristics of the oil. Normally, amounts of from about 0.5 to about 3 weight percent of copolymer are employed (percentages being based upon weight of oil). The oils employed are the hydrocarbon oils of lubricating viscosity, whether of natural origin or synthetic. Preferred oils are substantially paraffinic and/or naphthenic, although some aromatic hydrocarbons can be present in the oil. The nature and production of such oils are well known.

It is within the scope of this invention to employ other types of additives in the lubricating compositions of the invention. Antioxidants, extreme pressure agents, pour point depressants, and the like are examples of known types of additives.

The lubricating compositions of the invention are useful in automobile crankcases and as lubricants in other internal combustion engines.

The examples which follow illustrate the invention.

EXAMPLE 1

(a) To 73.12 gms. (0.5 g. mole) triethylenetetramine and 100 gms. toluene being stirred at 80° C. in a 500 ml. kettle was slowly added an 80° C. solution of 118 gms. (0.60 g. mole) heptenyl succinic anhydride and 50 gms. toluene. The exothermic reaction was maintained between 80 and 110° C. by removing the heating mantle. In about three hours, 12.0 gms. (0.60 g. mole) water was removed by azeotropic distillation. After cooling, the amount of product in toluene was calculated by a material balance to be 60.8 percent.

(b) The above experiment was repeated except 196 gms. (1.0 g. mole) heptenyl succinic anhydride was used. The total solids was 69.4 percent and 17.5 gms. (0.973 g. mole) water was removed. (5DCG–10–5.) This product is insoluble in heptane.

In order to incorporate these imides into a copolymer, the imide in toluene solution, acrylic acid, isodecyl acrylate, solvents, and free-radical initiator were separately weighed into a polymerization bottle which after being purged with nitrogen and capped was rotated end-over-end in a constant temperature bath for about 24 hours. The acrylic acid and imide react before polymerization is initiated. The conversion of monomer to polymer is determined by stripping the volatiles from a sample of the final solution. The polymer is then solvent exchanged into a lubricating oil. Because the above imides are oil insoluble the presence of insolubles at this point would mean the reaction product of the imide and acrylic acid did not enter the copolymer. Dilute blends of 1.17 percent polymer and 1.0 percent zinc dialkyl dithiophosphate inhibitor package (Amoco 193) in a 200 SUS lubricating oil were prepared and the dispersancy properties of the blend evaluated in engine tests such as the modified Sequence 5A. This test is designed to measure the ability of the oil to keep the engine free of sludge. The results of tests on polymers containing the above imides are compared with the results obtained on commercial viscosity index improver-dispersants in the following table:

TABLE I

| Polymer composition | Number of hours of testing to obtain an ([1]) 8.0 av. sludge rating |
|---|---|
| No polymer used | 36 |
| Acryloid 966 | 100 |
| Acryloid 917 | 88 |
| Do | 93 |
| Isodecyl acrylate (89.93 parts) } Example 1(b) (8.0 parts)[2] } Acrylic acid (2.07 parts) } | [3] 9.1 |
| Isodecyl acrylate (90.10 parts) } Example 1(b) (8.0 parts)[2] } Acrylic acid (1.9 parts) } | 67 |
| Isodecyl acrylate (89.93 parts) } Example 1(b) (8.0 parts)[2] } Acrylic acid (2.07 parts) } | 133 |

[1] Eight parts in the engine are related for cleanliness with a perfectly clean engine receiving a 10.0 rating. An average rating of all the parts is periodically obtained. (Modified Sequence 5-A test, defined below.)
[2] On an imide basis, not on a solution basis.
[3] Rating at 120 hours.

EXAMPLES 2–5

Several additional imides, shown in Table II, were prepared by the procedure given in Example 1. The acrylic acid salts of these imides were polymerized with isodecyl acrylate and the resulting polymers blended into oil and evaluated as in Example 1. As shown in Table III all of these polymers were dispersants.

TABLE II

Example No.:            Composition of imide
2 ------ Nonenyl succinic anhydride (0.40 mole). Tetraethylene pentamine (0.20 mole).
3 ------ Maleic anhydride (0.10 mole). Nonenyl succinic anhydride (0.30 mole). Tetraethylene pentamine (0.20 mole).
4 ------ Heptenyl succinic anhydride (0.245 mole). Succinic anhydride (0.105 mole). Triethylene tetramine (0.175 mole).
5 ------ Methyltetrahydrophthalic anhydride (0.35 mole). Triethylene tetramine (0.175 mole).

TABLE III

| Composition | Sequence 5A engine test evaluation, hours to reach an 8.0 rating |
|---|---|
| Example 2 (8 parts) } Acrylic acid (1.76 parts) } Isodecyl acrylate (90.24 parts) } | 92 |
| Example 3 (8 parts) } Acrylic acid (1.46 parts) } Isodecyl acrylate (90.54 parts) } | 84 |
| Example 4 (8 parts) } Acrylic acid (2.33 parts) } Isodecyl acrylate (89.67 parts) } | 105 |
| Example 5 (8 parts) } Acrylic acid (2.33 parts) } Isodecyl acrylate (89.67 parts) } | 116 |

EXAMPLE 6

A composition consisting of the acrylic acid (2.07 parts) salt of the heptenyl succinic anhydride and triethylene tetramine imide (8 parts), 59.93 parts isodecyl acrylate, 20.0 parts stearyl methacrylate, and 10 parts methyl methacrylate was prepared by the polymerization procedures given in the preceding examples. A blend of 1.17 percent of this polymer and 1.0 percent of a zinc dialkyl dithiophosphate in a 200 neutral lubricating oil was prepared and evaluated in the Low Temperature Sludging engine test. After 86 hours, the test was terminated. A sludge rating of 39.1 was obtained for a blend of 1.0 percent of Amoco 193 in the same lubricating oil.

In addition to dispersancy, blends containing this polymer have viscosity index improving and pour depressing properties. The viscosity index and 210° F. viscosity of this fluid were 128.5 and 8.73 centistokes, respectively. Also, the pour point was −15° F. The viscosity index, 210° F. viscosity, and pour point of the oil are 97, 6.30 centistokes, and 5° F., respectively.

EXAMPLE 7

Two copolymers similar in composition to the polymer of Example 6 were prepared by the Example 6 procedure and evaluated for dispersancy in the Low Temperature Sludging engine test (defined below). Each composition contained the acrylic acid (2.07 parts) salt of the heptenyl succinic anhydride and triethylene tetramine di-imide (8.0 parts), and stearyl acrylate (20 parts). One polymer (7–a) also contained isodecyl acrylate (69.93 parts) and the other polymer (7–b) also contained isodecyl acrylate (59.93 parts) and methyl methacrylate (10 parts). Blends of these polymers were prepared and evaluated in the Low Temperature Sludging engine test.

TABLE IV

| Example | Low temperature sludging test | |
|---|---|---|
| | Hours tested | Sludge score [1] |
| 7–a | 110 | 42.5 |
| 7–b | 110 | 40.5 |
| | 134 | 38.8 |
| Acryloid 917 | 110 | 40.0 |
| | 131 | 31.6 |
| Acryloid 966 | 110 | 36.6 |

[1] The total of five parts each of which can get a 10 score.

As shown by the above results the polymers of this invention are superior in dispersancy to the two commercial dispersants.

EXAMPLE 8

Into a 3-necked 500 ml. glass kettle were weighed 59.93 gms. isodecyl acrylate, 20.0 gms. stearyl acrylate, 10.0 gms. methyl methacrylate, 0.69 gm. acrylic acid, 5.48 gms. of a solution in toluene at 48.6 percent of the di-imide of heptenyl succinic anhydride and triethylene tetramine, and 0.1 gm. azobisisobutyronitrile. This solution was heated to 60° C. with continuous stirring and with nitrogen purging. After two hours the polymer and monomer solution had become very viscous and it was necessary to dilute the solution with 14.7 gms. heptane. After another 95 minutes, 5.48 gms. of the above di-imide solution, 0.69 gm. acrylic acid, and 11.5 gms. heptane were added to the kettle contents. After another 105 minutes, 0.1 gm. azobisisobutyronitrile was added. After another 135 minutes, 5.48 gms. of the above di-imide solution, 0.69 gm. acrylic acid, 22.8 gms. heptane, and 0.1 gm. azobisisobutyronitrile were added. After running at 60° C. for 20 hours the solution was cooled and analyzed. The conversion of monomers to polymer was found to be 95.7 percent and the reduced viscosity (0.1 gm. polymer in 100 ml. benzene at 20° C.) to be 1.25. This polymer was evaluated in the Low Temperature Sludging engine test at the same conditions as the polymers in the previous example. Its blend received a rating of 36.4 after 110 hours of testing. This polymer and the Example 7–b polymer which received a 40.5 rating after 110 hours, have the same chemical composition but they differ in the manner in which the polar monomer was distributed in the polymer.

In addition to having dispersancy properties approximately equivalent to those of Acryloid 966, the polymer improves the viscosity index of the oil. This blend had a 210° F. viscosity of 8.65 centistokes and a viscosity index of 129.

EXAMPLE 9

A polymer of isodecyl acrylate (59.93 parts), stearyl acrylate (20 parts), acrylic acid (2.07 parts), and methyl methacrylate (10 parts) was prepared by the solution polymerization techniques given in the preceding examples. A solution of this polymer (92 parts) in heptane (258 parts) was diluted with lubricating oil (134 parts). This solution was heated to 70° C. and then poured into a stirred kettle containing the di-imide (8 parts) of heptenyl succinic anhydride and triethylene tetramine dissolved in toluene. After stirring for one hour at 70° C., the volatile solvents were removed by a vacuum distillation at 1 mm. Hg and 100° C.

A blend of this polymer received a 34.8 sludge score after 110 hours in the Low Temperature Sludging engine test.

The low temperature sludging test referred to above is carried out as follows:

Low temperature sludging test procedure (CLR engine)

| | |
|---|---|
| Run duration, hours [1] | 110 |
| Temperature cycle, hours | 6 cold—2 hot |
| Speed, r.p.m. | 1500 |
| Fuel flow, lb./hr. | 3.5 |
| Air-fuel ratio | 14.2 |
| Carburetor air temperature, ° F. | 110 |
| Mixture temperature, ° F. | 100 |
| Crankcase pressure, p.s.i.g. | 0 |
| Compression ring gap, inches | 0.060 |
| Crankcase blow-by, c.f.h. | 32 |
| Spark advance, ° BTC | 15 |
| Oil pressure, p.s.i.g. | 40 |
| Oil charge, lb.[2] | 1.8 |
| Cold cycle: | |
|   Coolant jacket-out, ° F. | 110 |
|   Oil gallery, ° F. | 115 |
|   Rocker arm atmosphere, ° F. | 95 |
| Hot cycle: | |
|   Coolant jacket-out, ° F. | 190 |
|   Oil gallery, ° F. | 170 |
|   Rocker arm atmosphere, ° F. | 175 |

[1] If little or no sludge formation is noted, test may be extended.
[2] No oil additions allowed during the test.

The modified sequence 5A test procedure is as follows:

Modified Sequence 5A test procedure (CLR engine)

The modified Sequence 5A screening test procedure (although basically similar to the standard Sequence 5A test) contains several procedural changes designed to expedite testing and minimize operational costs. The most important changes included elimination of the hot soak period, increased piston ring blow-by and elimination of all oil additions. None of these changes, however, are expected to seriously effect test results. In order to further minimize costs, the engine is not rebuilt between tests, but is partially disassembled and spray flushed with solvent. The hydraulic valve lifters are replaced to minimize oil carry-over and a 10 minute flush run is made with the new test oil prior to initiation of the test.

TEST SCHEDULE

| | Phase I | Phase II |
|---|---|---|
| Time | [1] 45 | [2] 2 |
| Speed, r.p.m. | 600 | 1,800 |
| Load, b.h.p. | 0 | WOT |
| Water temperature, ° F. | 125 | 125 |
| Oil temperature, ° F. | 100–125 | 165 |
| Air-fuel ratio | 10:1 | 16:1 |
| Air-fuel mixture temperature, ° F. | 120–125 | 120–125 |
| Crankcase blow-by, CHF | | 20 |

[1] Minutes.
[2] Hours.

The engine is run with 1.85 pounds of test oil. Phases I and II are repeated continuously until the rocker arm area sludge rating drops below 9.5. Complete sludge ratings are then performed at eight-hour intervals until an average CRC sludge rating of 7.5 has been reached, at which time the evaluation is terminated.

What is claimed is:
1. A lubricating composition which comprises a major amount of hydrocarbon oil of lubricating viscosity and a minor amount, sufficient to enhance the detergent characteristics of said oil, of a copolymer of (a) an oil-solubilizing proportion of a long chain alkyl acrylate or methacrylate, said long chain alkyl containing from about 8 to about 20 carbon atoms and (b) an acrylic or methacrylic salt or amide of a diimide of the formula:

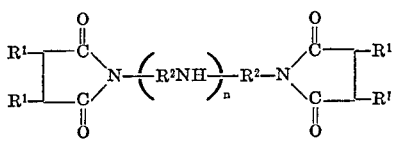

wherein each $R^1$ individually represents hydrogen, alkyl or alkenyl of up to 20 carbon atoms, or two $R^1$ groups taken together to form a cycloalkyl, cycloalkenyl, cycloalkadienyl, or an aryl group, wherein $R^2$ represents ethylene or propylene, and wherein $n$ represents a number having a value of at least 1.

2. The lubricating composition of claim 1 wherein the diimide is a diimide of an alkenylsuccinic anhydride and a polyethylenepolyamine.

3. The lubricating composition of claim 2 wherein the diimide is a diimide of heptenylsuccinic anhydride and triethylenetetramine.

References Cited
UNITED STATES PATENTS

| | | | |
|---|---|---|---|
| 2,892,792 | 6/1959 | Stewart et al. | 252—51.5 XR |
| 2,892,816 | 6/1959 | Lowe et al. | 252—51.5 XR |
| 3,004,987 | 10/1961 | Paris et al. | 252—51.5 XR |
| 3,052,648 | 9/1962 | Bauer | 252—51.5 XR |
| 3,154,560 | 10/1964 | Osuch | 252—51.5 XR |

PATRICK P. GARVIN, *Primary Examiner.*